US006301701B1

(12) United States Patent
Walker et al.

(10) Patent No.: US 6,301,701 B1
(45) Date of Patent: **\*Oct. 9, 2001**

(54) METHOD FOR COMPUTER-ASSISTED TESTING OF SOFTWARE APPLICATION COMPONENTS

(75) Inventors: Jeffrey L. Walker, Ross; Samer Diab, Fremont; Adam Slovik, San Francisco, all of CA (US)

(73) Assignee: TenFold Corporation, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,274

(22) Filed: Nov. 10, 1999

(51) Int. Cl.$^7$ ........................................... G06F 9/45
(52) U.S. Cl. .................... 717/4; 717/8; 702/123; 707/3; 707/104
(58) Field of Search .................... 717/4, 8, 7, 9; 702/123; 714/38, 45; 371/16.1; 364/300

(56) References Cited

U.S. PATENT DOCUMENTS

| 4,648,036 | * | 3/1987 | Gallant | 707/203 |
| 5,218,605 | * | 6/1993 | Low et al. | 714/45 |
| 5,511,185 | * | 4/1996 | Weinbaum et al. | 714/38 |
| 5,600,789 | * | 2/1997 | Parker et al. | 714/38 |
| 6,061,643 | * | 5/2000 | Walker et al. | 702/123 |

OTHER PUBLICATIONS

Litwin–Getz–Gilbert, Access 97 Developer's Handbook, Jan. 1997Sybex, Third Edition, pp 538–540 & p. 1264.*

* cited by examiner

Primary Examiner—Mark R. Powell
Assistant Examiner—Hoang-Vu Antony Nguyen-Ba
(74) Attorney, Agent, or Firm—Kirton & McConkie; Michael F. Krieger

(57) ABSTRACT

A method and computer product for facilitating automatic testing during the development and other life cycle phases of a software application comprised of transactions. A transaction tester evaluates the integrity of a transaction by generating test data from the definition of the transaction under test. Typical values for fields may be included within the transaction definition and reused as typical test values. Test results are generated and compared against known-good values or, alternatively, against expected test results also generated from the transaction definition. Other software components may also be tested including menu structures. A definition of the menu structure is rigorously traversed such that each entry of each menu is thoroughly tested and reported. Results are automatically compared and verified against known good results or test results are automatically reviewed. Both transaction testing and menu testing may be incorporated into regression testing.

30 Claims, 8 Drawing Sheets

| VIEW | FIELD | SAMPLE VALUES |
|---|---|---|
| ORDERS | CUSTOMER NAME | IBM, COMPAQ |
| | ORDER NUMBER | 56530, 12010 |
| | ORDER DATE | 12/1/96, 12/2/96 |

*— 16*

```
# THIS TEST CASE ADDS AN ORDER, RE-QUERIES IT TO MAKE A
# CHANGE, QUERIES IT AGAIN, AND THEN ERASES IT.
# FINALLY, IT TRIES TO QUERY IT ONE MORE TIME TO ENSURE
# THAT IT ERASED SUCCESSFULLY. AFTER THE QUERY FAILS, IT
# CLOSES THE TRANSACTION.
$TESTCASE$TESTORDERS, ORDERS
001,ADD,IBM,56530,12/1/96
002,QUERY,,56530
003,MODIFY,,,12/2/96
004,QUERY,,56530
005,ERASE
006,QUERY,,56530
```

| | | |
|---|---|---|
| ENTER ORDER | 001 | 001 | ORDERS, 1, ADD, IBM, 56530, 12/1/96, INTERNAL |
| ENTER ORDER | 001 | 002 | MENU ORDERS (80) |
| ENTER ORDER | 001 | 003 | ENTER ORDERS |
| ENTER ORDER | 001 | 004 | CUSTOMER |
| ENTER ORDER | 001 | 005 | CUSTOMER NAME" |
| ENTER ORDER | 001 | 006 | CUSTOMER NUMBER" |
| ENTER ORDER | 001 | 007 | ORDER DATE" |
| ENTER ORDER | 001 | 008 | ORDER TYPE |
| ENTER ORDER | 001 | 009 | RADIO BUTTON 'INTERNAL' (OFF) |
| ENTER ORDER | 001 | 010 | RADIO BUTTON 'EXTERNAL' (OFF) |
| ENTER ORDER | 001 | 011 | BUTTON 'QUERY' |
| ENTER ORDER | 001 | 012 | BUTTON 'CANCEL' |
| ENTER ORDER | 001 | 013 | ENTER, CUSTOMER, IBM |
| ENTER ORDER | 001 | 014 | ENTER, ORDER, NUMBER, 56530 |
| ENTER ORDER | 001 | 015 | ENTER, ORDER, DATE, 12/1/96 |
| ENTER ORDER | 001 | 016 | ENTER, ORDER TYPE, EXTERNAL |
| ENTER ORDER | 001 | 017 | CUSTOMER NAME" -> 'IBM' |
| ENTER ORDER | 001 | 018 | ORDER NUMBER" -> '56530' |
| ENTER ORDER | 001 | 019 | ORDER DATE" -> '12/1/96' |
| ENTER ORDER | 001 | 020 | ORDER TYPE |
| ENTER ORDER | 001 | 021 | RADIO BUTTON 'EXTERNAL' -> (ON) |
| ENTER ORDER | 001 | 022 | CLICK DONE |
| ENTER ORDER | 001 | 023 | CLICK CANCEL |

FIG. 7

August 8, 1997          AutoCompare Differences Report          Page 1
                                        between
                        Current Test Results and Approved Test Results AutoCompare ignored
   Leading Spaces, Trailing Spaces, Embedded Spaces,
   Different Case, Blank Lines Current Test Results differs from Approved Test Results because:

Has: Enter Order 001 005          Order Date '12/1/1996'
Not: Enter Order 001 005          Order Date "
Missing: Enter Order 001 017      Order Date "
Extra: Enter Order 001 018        Order Number " -> '56530'
                                  Customer Name " -> 'IBM'

FIG. 8

METHOD FOR COMPUTER-ASSISTED TESTING OF SOFTWARE APPLICATION COMPONENTS

This application is related to commonly assigned pending U.S. application Ser. No. 09/111,049, titled METHOD FOR DEFINING DURABLE TEST DATA FOR REGRESSION TESTING, herein incorporated by reference for all purposes.

BACKGROUND OF THE INVENTION

The present invention relates to computer programming, and to regression testing of computer software. More particularly, this invention relates to assisted testing of software application components from the development through maintenance phases.

Complex, mission-critical business applications typically contain large numbers of on-line transactions, each of which consists of considerable functionality. The quality of software applications largely depends on extensive testing of the functionality of each of the on-line transactions to ensure completeness and correctness. Software developers recognize that testing of applications software is an ongoing or continuous process that must be integrated into every phase of the application software life cycle including the design phase, development phase, unit testing phase, systems testing and integration phase, quality assurance phase, customer installation and support phases as well as the application maintenance phase.

Present industry trends dictate that approximately eight hours are required to thoroughly test an applications transaction if the individual performing the test both understands the transaction and has data available for testing. Therefore, if an application contains 500 transactions, such an application would require approximately 4000 hours to comprehensively test the application, if there are no errors present. Furthermore, in order to properly test an application, when an error is discovered and fixed, the entire test must be performed again precisely in the same manner using the same data to ensure that the repair for the discovered error did not inadvertently introduce another error into the application.

Additional shortcomings are also present in the traditional manners in which software applications have been tested. For example, due to the large number of hours required for properly testing the transactions of an application, dedicated testing staff have generally been required. It is both impractical and expensive to dedicate large numbers of staff to perform such manual testing processes. Furthermore, in order to properly test software applications transactions, it is important to capture product content knowledge, usually best appreciated by applications experts, for use in selecting test data. To do so ensures a more robust testing of application transactions. However, to transfer such knowledge and skill from the originating entity, such as the applications expert, to a transaction tester requires additional time and resources for such a knowledge transfer. Additionally, manual testing of application transactions by humans may inject additional errors such as the disregarding of a test sequence or the inadvertent overlooking of test results. Furthermore, one of the more overriding issues in software transaction testing occurs when changes are made to transactions thereby obsoleting a substantial portion of the test information.

Traditional automated applications testing strategies have only been partially successful in minimizing the manual nature of transaction testing. For example, one type of automated application testing employs a keystroke-capture technique (FIG. 1) wherein the computer memorizes the keystroke and mouse movements performed by the test operator enabling the computer to replay the test at a later time for retesting the application. Such keystroke-capture techniques fall short for many reasons. For example, for testing strategies employing keystroke-capture techniques, any changes, even subtle changes, to the graphical nature of the transactions render the prior tests unusable. Furthermore, the test data generated by a keystroke-capture technique is normally unmaintainable and incomprehensible, and therefore, any changes to the test data require the re-creation of the entire test.

Additionally, keystroke-capture testing techniques typically do not generate output but rather sequentially execute the transaction undergoing test. Therefore, to evaluate the behavior of the test, a test operator must physically observe the test being executed to verify the results. Furthermore, such keystroke-capture techniques yet introduce the human error aspect into transaction testing as the test operator is required to observe and visually verify the integrity of the test. Finally, keystroke-capture testing techniques are difficult and even impossible to document and verify as hard copies of test data are unavailable, or are at least incomprehensible as they are a series of cryptic graphical commands addressed to the graphical user interface of the application undergoing testing.

Preparation of test data is yet another shortcoming of traditional automated testing techniques. Presently, there does not exist an acceptable way to develop test data for traditional testing methods except by using traditional manual techniques for developing such tests. Furthermore, once test data is developed, maintaining such test data is virtually impossible as it has a manually developed origin. Therefore, applications programmers have heretofore invented or created non-meaningful data that often does not actually properly exercise the transaction or application undergoing the testing process. While present testing strategies are lacking in proper discipline, the tools and strategies necessary for improving testing methods and strategies have heretofore been nonexistent.

Yet another shortcoming of traditional software testing techniques includes the inability or at a minimum, the lack of ease available to a transaction designer to test a specific transaction as an individual unit. Prior techniques have required the transaction designer to create a shell program around the target transaction to verify its correct performance. As most software application that access databases are comprised of a substantial number of transactions, the inordinate amount of shell or environment-simulating software that is required to test a software applications associated transactions can easily approach or exceed the quantum of software inherent in the target application. Furthermore, an automated approach for verifying the integrity of specific structures such as menu structures within a software application have also been required to be performed manually. That is to say, the sequential and thorough testing of a menu structure within a software application has heretofore required extensive and manually intensive interaction by the transaction designer or software application tester.

While present industry trends such as the heterogeneity of computer architectures and communication standards exacerbate the testing discipline, other modem trends such as the low-cost and increased speed of computer resources facilitate the economical implementation of an advanced applications testing philosophy. Thus, what is needed is a method for testing a software applications transaction using test data that can be automatically generated by a computer from the analysis of the transaction and remains robust or dynamic through modifications to the transaction. What is yet needed is a method for thoroughly testing hierarchal structures, such as menus, in an automated manner.

SUMMARY AND OBJECTS OF THE INVENTION

The foregoing problems in the prior state of the art have been successfully overcome by the present invention, which is directed to a method for regression testing a transaction in a software application using a test case comprised of test data wherein the test data describes the regression test at a functional or behavior level and executes the regression test at a physical level, and further wherein changes to the transaction do not result in unusable test data.

It is an object of the present invention to provide a method for testing a transaction of a software application using test data that is automatically generated from a definition of the transaction.

It is a further object of the present invention to provide a method for reporting test results from test data executed by a transaction undergoing testing. It is a further object of the present invention to provide a regression test methodology wherein a report generated by a regression test of a transaction contains information that is comprehensible and valid for the test data posed to the transaction under test.

It is yet another object of the present invention to provide an automated method for verifying results of a test that is automatically generated.

It is yet another object of the present invention to provide an automated method of providing regression testing of a transaction wherein a test report generated by a test run may be compared to a control test report exhibiting test results accepted as a baseline performance of the transaction.

It is yet another object of the present invention to regression test a menu portion of a software application that interacts with a database and to thoroughly test each entry in the menu structure including fields within transactions that are defined as a set of valid data values.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and computer program product for regression testing a transaction using a test case comprised of test data derived from a definition of the transaction wherein the test data describes the regression test at a functional or behavioral level and executes a regression test at a physical level is provided.

Development of a software application is traditionally an evolutionary process through which an application designer initially generates a first cut or version of a software application and thereafter modifies and revises the application to meet consumer demands or functionality requirements. Such an evolutionary process requires that software be tested at various phases in the development process. While change is inevitable in the underlying transactions of the software application, a software developer would desire to not recreate transaction test code for modifications to a transaction. The designer would also desire the ability to individually test a transaction through all phases of design.

Furthermore, the transaction designer also desires to establish a baseline such that subsequent modifications to other transactions within a software application may be tracked and verified to assure they do not inject aberrant behavior into the application. Such performance tracking is commonly known as regression testing wherein the application is rigorously and periodically tested to verify that the performance is not regressing from a former state. In order to facilitate a testing-friendly environment, the present invention provides for an analysis of the physical underlying test sequence for the transaction with the conversion of the test sequence to a functional description which is thereafter stored as the executable test case. The storing of such functional level test data provides a robust descriptive layer that typically remains static through the development and other various processes through which a software application passes. For example, in the development of a specific transaction for editing a database, a transaction designer may place specific data fields within a frame at locations preferable to the transaction designer and consistent with a transaction designer's prior experiences. However, during a subsequent evaluation phase, such as at the time of demonstration of the transaction to the customer, the customer may request a different configuration of the transaction fields within the displayed frames The present invention freely accommodates the physical manipulations and changes associated with the transaction evolution without resulting in any changes of the test code. The present invention also facilitates the individual testing of a transaction during all pheases of development.

The present invention facilitates a rapid and efficient testing of the transactions of a software application. In the present invention, a portion of the testing module forms a transaction tester capable of automatically testing transactions. When the transaction designer defines a specific transaction, the transaction designer provides typical realistic values for each of the fields within the transaction. The automated transaction tester uses these field values in transaction tests or, alternatively, when a specific transaction does not list typical field values, then the transaction tester creates suitable data for the fields based on the field type as defined in the transaction definition. The transaction tester of the present invention also produces a test report that describes a transaction test and the resulting transaction behavior. The transaction tester automatically creates a regression test that thoroughly tests each transaction by adding data into each field of the frame, optionally, the transaction tester continues the test by querying the data to ensure it added the data correctly, modifying the data, querying again to ensure the modification was performed correctly, and erasing the data and querying again the database to ensure that the modified data value was erased. The present invention also automatically reviews test results to determine whether transaction behavior was correct during the test.

The present invention also performs an extensive and thorough testing of structures within a software application such as menu structures. In the present invention, a menu tester exercises all menus that are attached to the application and the associated responsibilities and verifies that each menu entry invokes another menu, a transaction, or other functionality within the software application. The menu tester also checks that each transaction successfully opens from the menu and thoroughly tests entries within a field of a transaction that form a set of valid values for a specific field. Such specific valid values forming the set of valid field values are often called "pick list" or "combo box," which provides the software application user a list of valid values for a specific field.

Therefore, the present invention provides an advantage over the prior art by allowing a transaction to be individually tested with test data automatically generated at a functional level and storing such information in a test case as test data. Furthermore, the test data may be presented in a test report and, due to the functionally intelligible nature of the test data description, thereby providing an informative and intuitive language through which test reports may be automatically or manually evaluated. Menu structures within the software application may also be extensively tested.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 depicts a simplified transaction definition and a corresponding test case for evaluating the functionality of the transaction, in accordance with a preferred embodiment of the present invention;

FIG. 7 depicts a test report describing the test data presented to the transaction and FIG. 8 depicts the results generated by the transaction, in accordance with the preferred embodiment of the present invention.

DETAILED DESCRIPTION OF THE PREFERRED EMBODIMENTS

Figure 1:
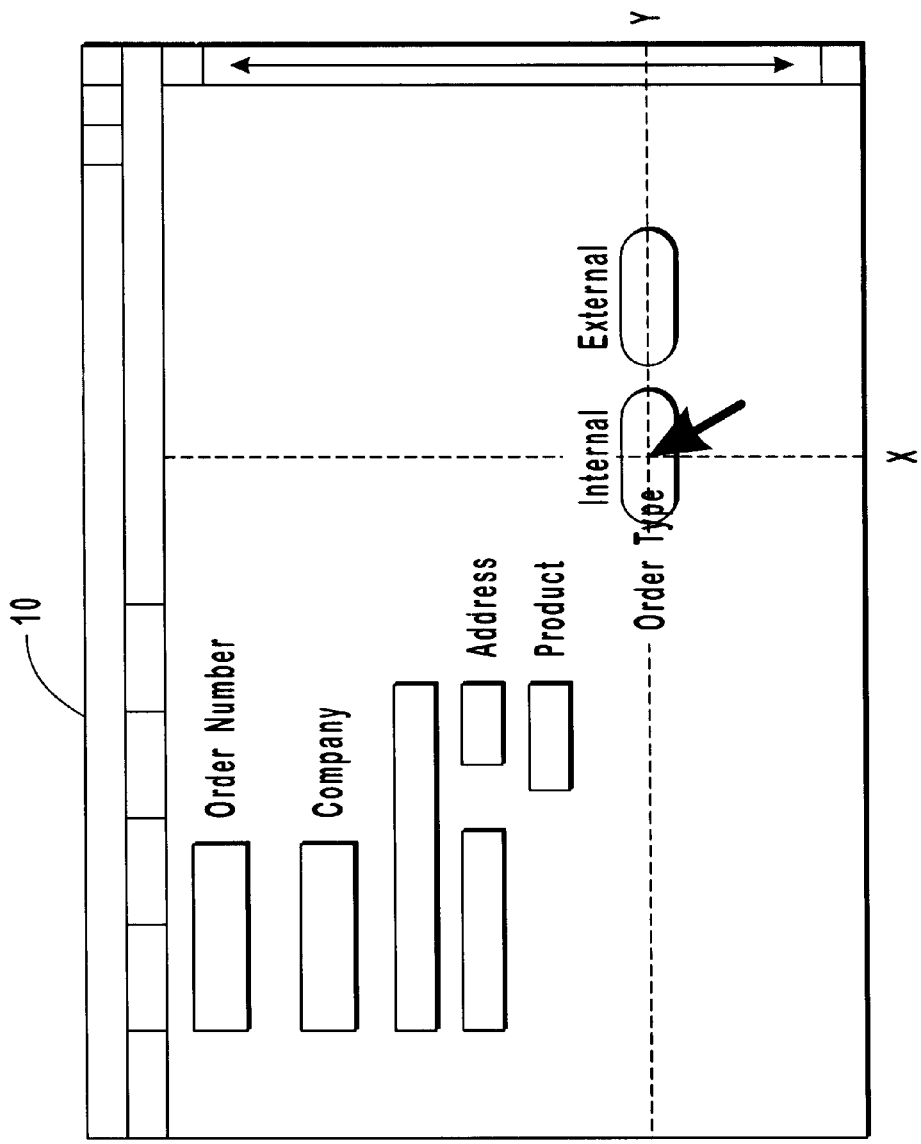
FIG. 1 depicts a frame displayed from a transaction and associated automation techniques, in accordance with the prior art.

While the shortcomings of the prior art have been discussed above, the present invention provides a method wherein an applications designer may develop test data for verifying the operation of a transaction in a software application and test an individual transaction as well as structures including menus within the software application. Furthermore the test data, as implemented in the present invention, is preserved at a functional level to accommodate changes to the transaction such as the moving of text fields to other locations within the frame or the changing of the presentation of particular fields from one form to another (e.g., the changing of a text entry field to a radio button group) does not affect the integrity of the test data. The preferred embodiment of the present invention employs a software tool, herein after referred to as the auto test module.

The auto test module contains several features and other modules that enable a transaction designer to both utilize test data in the testing of a transaction and perform other features aiding in the automatic or computer assisted creation of test data and test reports.

The method for regression testing of the present invention is embodied in the use and implementation of the auto test module. The auto test module is a software product that aids the transaction designer through the process of creating, using, maintaining and managing complete and thorough software applications regression tests throughout each phase of an applications development cycle. The present invention further provides a method for creating many regression tests automatically and defining additional ones with simple wysiwyg (what you see is what you get) interfaces. The auto test module of the present invention combines many features which advance the software development process by incorporating many features that automate the testing methodology. In general, when the regression test of the present invention is executed, the auto test module has a capability of generating data or may alternatively utilize data generated by the evaluation of a test operator or transaction designer who has initiated the appropriate keystrokes and mouse clicks to simulate the end-user use of the application. As an output to the regression testing of a transaction, the auto test module creates a test report that documents each simulated end-user interaction and each application or transaction response.

Furthermore, the end-user may also interactively review the test report to verify that the test ran as desired. Also, in keeping with the automated capability of the auto test module, another feature, discussed in more detail below, automatically compares the current test report with another control test report to either approve the test results or enumerate the differences in the test results. A more specific feature of the present invention is the ability of the present invention to test a transaction within the software application by automatically generating test data from the definition of the transaction.

While the auto test module is a global concept as described herein, it is important to define certain terms as used throughout the description of the present invention in order to maintain clarity. Such terms are defined as follows:

As used herein, the term "auto capture" refers to a component that facilitates the creation of test cases for transactions by monitoring the performance of the test in the transaction itself. That is to say, auto capture observes the behavior of the test operator and creates a test case that performs or replicates the same behavior.

As used herein, the term "auto compare" refers to a component that compares two test reports and produces a difference report therefrom. Additional capability is also included within the auto compare component enabling filtering or customization of the output generated in the difference report.

As used herein, the term "test report" refers to an output generated from the execution of a test case.

As used herein, the term "control test report" refers to a version of a test case's test report that contains the correct or favorable results. In the present invention, when a regression test is executed, the report resulting from the test case in question may be compared with an output defined as the control test report.

As used herein, the term "data maker" refers to a component that employs rules defined by a test operator to create volume test data for use in a thorough testing of an application.

As used herein, the term "difference report" refers to the output generated from the auto compare process. Such difference reports enumerate the differences between auto test reports including any filters invoked during the compare process.

As used herein, the term "radio group" refers to a graphical object that represents the possible values for a field generally depicted as a group of buttons presented within a frame and selectable by a mouse click.

As used herein, the term "regression test" refers to a repeatable test that thoroughly exercises the components it tests and produces output that, when analyzed, verifies the correctness of the component or transaction.

As used herein, the term "test case" refers to a defined set of inputs for a component or transaction that generates a defined set of outputs.

As used herein, the term "transaction tester" refers to a component that manufactures test data from a definition of the transaction and therefrom creates, runs and checks transaction tests.

As used herein, the term "menu tester" refers to a component that exercises all of the menus associated with the responsibilities of an application. The menu tester component also verifies that each menu entry invokes another menu, transaction or other software functionality.

As used herein, the term "view" refers to groupings of data in a transaction that have many-to-one relationships between them.

Figure 2:
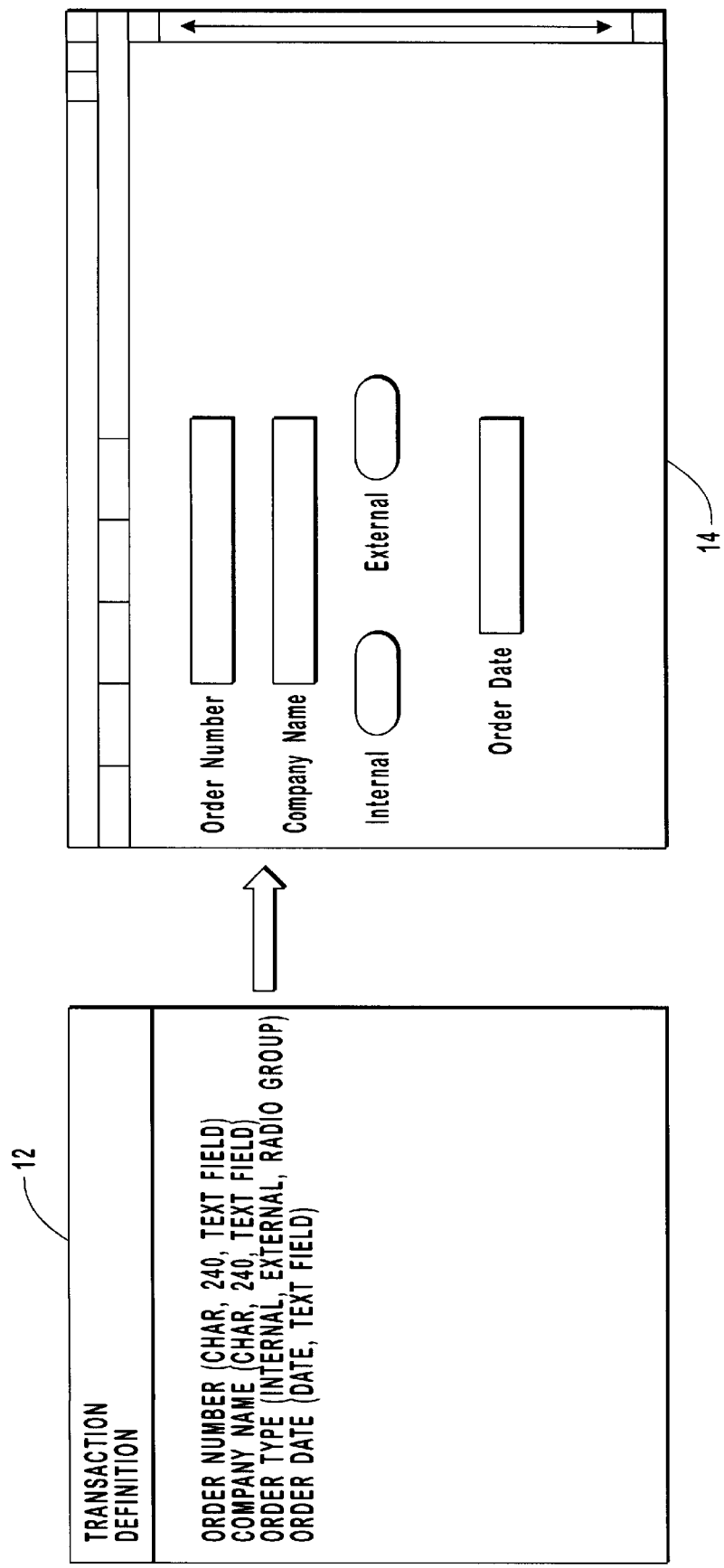
FIG. 2 depicts a transaction in a software application and a corresponding frame generated therefrom, in accordance with the present invention.

Transactions are typically defined as fundamental executable blocks for carrying out a specific task or function. A traditional transaction such as transaction 12 illustrated in FIG. 2 are defined as a series of fields having corresponding data types. FIG. 2 illustrates a typical transaction definition comprised of an order number and company name, each being of the type "character" with a length of 240 and having a display attribute of a textual field. Similarly, the order field is defined as having a data type radio group with two alternatives either internal or external and a display attribute listed as a radio group commonly illustrated as selectable buttons. The order date field is of the type "date" and is defined as having a display attribute corresponding to a text field.

FIG. 2 further illustrates the transaction frame presented to the user of the application as frame 14. It should be noted that the order number field, customer name field and order date field are presented as text fields corresponding to the depiction attribute defined in the transaction definition. Likewise, the order type field is depicted as a radio group allowing the user to simply select one of the radio buttons. If such a transaction were to be tested using the methods in the prior art, a simple recording of the X/Y coordinates corresponding to the selections made by the test operator would be recorded. In such a prior art configuration as shown in screen 10 of FIG. 1, were the transaction designer to modify the transaction definition to change the gender field to a text field as opposed to a radio field, the test data associated with the regression test would become unusable due to its storage of the test case at a physical level corresponding to the X/Y coordinates of the original frame information presented.

In the present invention, however, the test data is stored at a functional level, therefore, rather than storing an X/Y coordinate for the selection of the order type, for example as being external, the test case test data of the present invention stores the test data at a functional level denoting, in this case, the selection of order type as being "external." Such a storage of test information at an intermediate or function behavioral level is known in the present invention as test data. Furthermore, test data contains no information about the frame content or layout. Instead, test data contains the essence of a regression test and the auto test module determines how to execute that test case in a transaction at run-time. In the preferred embodiment, test data contains functions such as "add," "query," "modify," "erase," "show," or "choose." Therefore, the auto test module determines the transaction behaviors that such commands imply for each transaction and the test data simply contains a function, such as an add, and the associated data that makes up the test case. The auto test module thereafter determines the appropriate behavior to perform in the current version of the transaction undergoing testing. Since the test data contains no information about the current design of a transaction, the test cases still operate or execute when transaction changes are made by interacting with the field definitions.

Test data may consist of multiple lines of data for each test case. Each line is data that the auto test component enters into a single frame. FIG. 3 depicts a simplistic view of a transaction and the corresponding test case test data for performing the regression test on the exemplary transaction. In FIG. 3, transaction 16 is illustrated as an orders transaction which may be included within a larger application such as an order entry application. As illustrated in FIG. 3, the order transaction may be used to enter, examine and maintain orders. It should be pointed out that the order transaction references a set of data or a data set which may have multiple views such as an orders view, an orderlines view (i.e., a child of orders) and shipments view (i.e., a child of order lines). The fields of transaction 16 are illustrated as customer name, order number and order date. While an actual transaction in a software application would be more complex, the present example is simplified and sufficient for the illustration at hand.

FIG. 3 further depicts a test case 18 comprised of test data capable of exercising transaction 16. Test case 18, as the comment statement (the lines that start with the # symbol) suggests, tests the order transaction by adding an order, querying the order to make a change, modifying the order, querying again to verify the modification and erasing the added order which is subsequently verified by yet another query. In the present embodiment, test data is illustrated as comma-delimited text, however, other methods of delimiting and enumerating text are also equally valid and are also considered to be within the scope of the present invention. In the present embodiment, test case 18 is identified with a test case header which includes the test case name followed by the transaction to be tested by the test data. Each line of the test case, in the present embodiment, is enumerated with a line number followed by an action to be performed on the transaction as well as the values for fields that the auto test component enters or uses to complete the actions.

It should be reiterated that the auto test component lists field values in the test data lines without regard to the frame design or placement of fields within a displayed frame.

Instead, the auto test stores field values and the corresponding field. The auto test component thereafter uses the description of the transaction to convert the field values into the appropriate keystrokes and mouse clicks at test execution time, even if the field order changes.

As described above, the present embodiment utilizes six actions that may be performed upon a transaction in a test case. First, the "add" action tells the auto test component to create a new instance in the transaction using the data on the corresponding test data line. Secondly, the "query" action informs the auto test component to perform a query in the transaction using the data on the test data line as a query parameter into the database. Thirdly, the "modify" action requests that the auto test component change an instance that is currently in the transaction. In accordance with the preferred embodiment of the present invention, the auto test component only changes the fields for which a data value is provided. Fourthly, the "erase" action requests that the auto test component erase an instance in a particular view of the transaction data set. Fifthly, the "choose" action informs the auto test component to scroll through a column box or click the next button to reach a particular instance in the transaction. Finally, the "show" action tells the auto test component to record in a test report the current layout and contents of a view in the transaction. An additional command, the "click" action, requests that the auto test component click the button with the label listed in the test data line. Also, a "menu" command tells the auto test component to invoke the menu item which has the menu prompts in the test data line.

Figure 4:
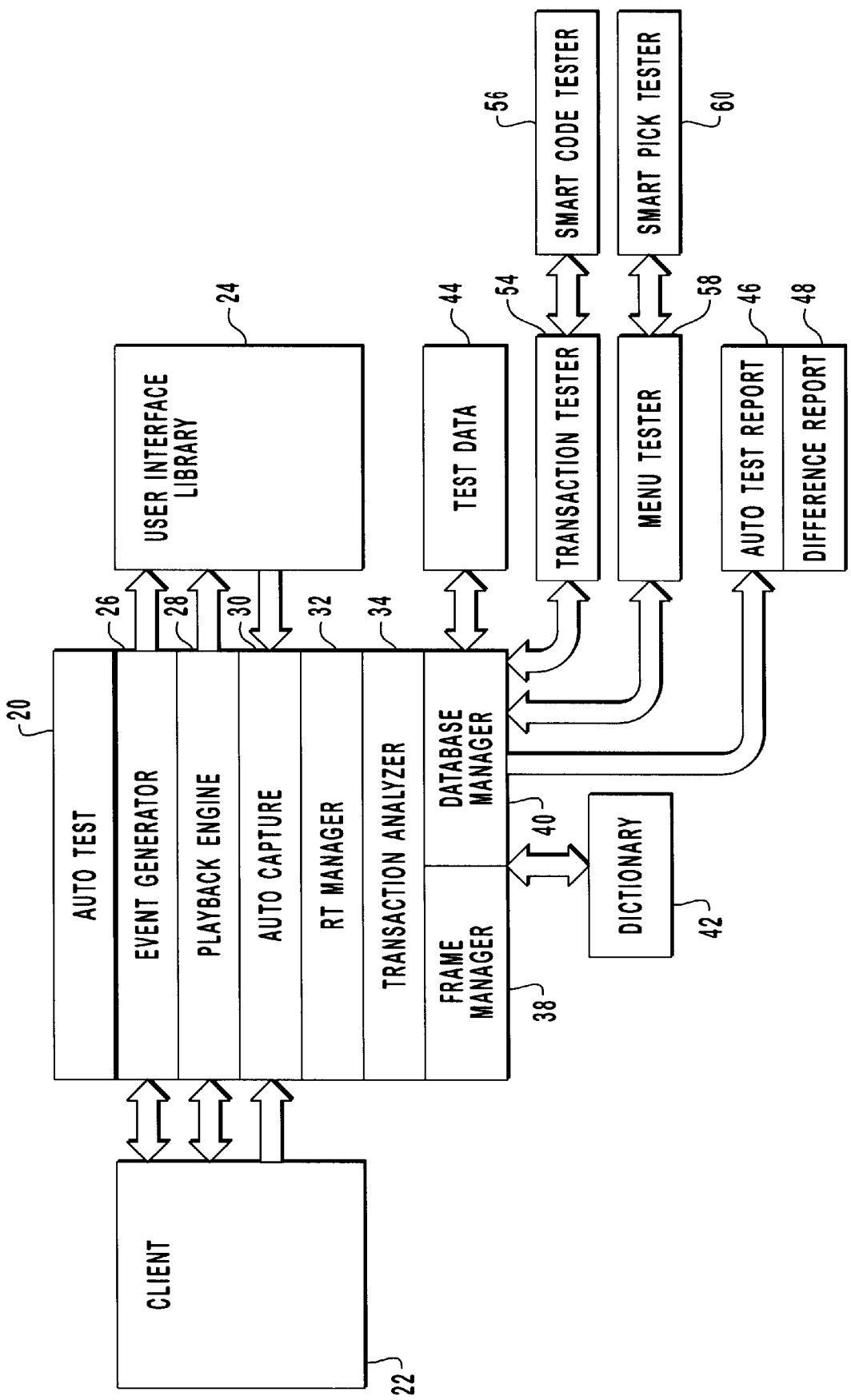
FIG. 4 is a simplified block diagram of the components of an automated testing environment, in accordance with the preferred embodiment of the present invention.

FIG. 4 is a high level block diagram of the components that comprise the auto test component, in accordance with the preferred embodiment of the present invention. In the preferred embodiment of the present invention, each of the components are designed using standard libraries to enhance portability and communicate one with another using APIs. Such an implementation enables the code associated with one layer to be changed or modified without affecting other layers by keeping the APIs consistent. Furthermore, such an implementation, or architecture enables different components to be developed or modified simultaneously. Auto test component 20 consists of a plurality of elements that facilitate its overall execution. Test data 44, as described above, is data in a functional format for testing which the auto test module stores the regression test. For example, when auto test module 20 employs an auto capture module 30 (see below) or another test generator such as a transaction tester or a data maker module (see FIG. 5), auto test module 20 produces test data 44. Furthermore, when executing a regression test, auto test module 20 reads test data 44 and drives such test data into an event generator 26 (see below) or a playback engine 28 (see below). A brief description of a portion of the related components immediately follows, while more extensive descriptions follow the listing of brief descriptions.

A client 22 is any executable that controls the transactions being tested.

Auto test module 20 produces a test report 46 (detailed in FIG. 7) as the output of each regression test run. Test report 46 describes the activity of the regression test and application responses.

A frame manager component 38 provides a layer within auto test module 20 that calls a dictionary 42 to obtain layouts of each frame and determines the appropriate method for entering data into the frames such as whether the data entry method is through a radio group of buttons or through a text entry field.

A database manager 40 is the layer of auto test module 20 that interfaces with the database library to obtain transaction information from a dictionary 42 that describes the transactions that comprise the software application. Auto test module 20 uses such information in a transaction analyzer 34 to determine appropriate behaviors for performing test functionality within transactions. Transaction analyzer 34 is the layer of auto test module 20 that uses knowledge of a transaction structure, frame layout and behavior of test data functions such as the "add" function to determine the next keystroke or mouse activity to perform in a transaction undergoing testing.

An auto capture module 30 is the layer of auto test module 20 that observes the client 22 and the user Interface activity to produce test data 44 that reproduces the observed activity.

A playback engine 28 provides the layer within auto test Module 20 that takes keystroke activity and mouse clicks that transaction analyzer 34 derived and drives those events interactively into a session as cooperatively generated by user interface library 24 and client 22.

A transaction tester 54 facilitates rapid, efficient and repeatable applications testing. Since a major portion of any software application that accesses a database involves transactions operating upon the database, auto test module 20 provides transaction tester 54 to provide these features for automatically testing transactions. Transaction tester 54 automatically creates, runs and checks transaction tests without the test operator having to provide test data or even review the test results. The present invention also provides the ability to create special transactions known as "smart code" transactions which enable a user to define valid values that the software application uses. In the present invention, when smart code transactions are created, the transaction designer also provides data values to populate the application database with codes and meanings that are necessary for demonstrations, regression tests and ultimately to populate a production database when the software application is fielded at the end user's site.

A menu tester module 58 provides a component for automatically exercising all of the menus in an application and, in particular, those menus attached to a specific responsibility associated with the application. Menu tester 58 verifies that each menu entry invokes either another menu, a transaction or other functionality within the application. Menu tester 58 verifies that each transaction successfully opens from the menu portion of the application. Furthermore, a smart pick tester module 60 checks each member of the set of valid values within a field, commonly known as smart picks, that form the set of valid data values for a field within a transaction.

While the structural elements of auto test module 20 and other associated support or interactive modules have been briefly described above, the description that follows describes many of these elements in greater detail and with specificity. As discussed above, auto test module 20 utilizes test data 44 for implementing the test cases for use in regression testing. The test data stores the test case at a functional or behavior level as opposed to storing the test steps at a low or physical level. In order to generate test data, auto test module 20 provides five mechanisms that may be used to create tests: transaction tester 54, auto capture module 30, menu tester module 58, smart code tester module 56 and data maker module. When any of these modules or mechanisms are used to develop test data 44, auto test module 20 produces an intermediate file called "test data" 44, which contains a description of the regression test and its data. Auto test module 20 includes an engine that can run test data in batch mode without supervision or interactively in on-line transactions. As described above, auto test module 20 also produces output for each run of a regression test called a test report 46. Such an output describes test activity and transaction/application responses and may be automatically compared to a previous report or to a control report for the generation of a difference report 48.

Auto Capture

As described above, the quality of a software application depends on how extensively the application components or transactions are tested for completeness and correctness. In the present invention, the auto test module 20 allows transaction designers to define tests by performing the test on the designed on-line transaction. That is to say, the auto test module 20 observes the use of the on-line transaction and remembers the essence of the behavior that the transaction designer performed while interacting with the on-line transaction and performs again that behavior at a future time on the transaction. Such a monitoring of a transaction designer's behavior or interaction with the transaction is performed by the auto capture module 30.

The auto capture module 30 shortens the time it takes to create a regression test by allowing a transaction designer or transaction tester to execute the transaction thereby creating the regression tests. Therefore, transaction designers or transaction testers do not need to learn a separate mechanism or testing language to create regression tests in addition to understanding the operation of the transaction. The auto capture module 30 furthermore creates the requisite sign-on and log-in procedures necessary for executing and bringing up in the displayed frame the transaction for which test data is being generated.

The auto capture module 30 is initiated by entering an identifying test case name designating the capture of the test operator actions into a specific test case. Such an identifier assumes the name of the test case desired to be created and may be further integrated into a regression test by specifying a regression test name. Auto capture module 30 monitors the physical actions which include the key strokes and mouse clicks performed by the test operator and, in conjunction with the transaction definition stored in the dictionary 42, transforms the physical actions into test data described at a functional level. Thereafter, auto capture module 30 stores the test data 44 into a test case for execution in a regression test. In the preferred embodiment, the test data 44 is stored in a database and likewise managed as database information by database manager 40. During a capturing session, the transaction operates within the client environment and the client passes functional descriptions resulting from physical actions taken by the test operator to auto test module 20 wherein capture module 30 transforms those functional requests into functional test data for storage within test data 44.

Play Back

The test case that is generated and stored as test data may alternatively be reviewed or rerun using play back engine 28. The play back option incrementally steps through an execution of a test case while allowing the test operator to view the activity and data of the online transaction undergoing testing. In the present embodiment, play back engine 28 may play back the test case in either a review mode or a rerun mode. In a review mode, the test case data and activity in the on-line transaction is displayed, however, the transaction is not re-exercised or re-executed but rather a step-by-step execution of the test data at the physical level is reviewed as requested by the test operator. In a rerun mode, the test case is actually re-executed with the auto test module showing the test case data and activity and simultaneously exercising the application or transaction functionality. In other embodiments of the present invention, additional functionality may be included within the play back feature such as controlling the play back speed to enable a user to manually view each of the executing steps and other features such as the inclusion of a stop or break point as well as a granularity adjustment for the number of execution steps to be performed prior to displaying the play back results. Play back engine 28 may further be utilized to edit a test case by playing back the test case and either selecting different data values for use in the test case or wholly erasing steps within the test case.

Test Reports

The auto test module 20 enables a test operator to execute an automated repeatable test consisting of one or more test cases. When a test case is executed, auto test module 20 generates an output to determine whether each test case executed with the results from such an execution. The auto test module 20 captures this output in a test report. Additionally, auto test module 20 enables a comparison of the test report with another or previous test report and even facilitates the designation of a specific test report as a control test report for utilization as a baseline for subsequent evaluation. Furthermore, the test data module 44 may also generate a difference report 48 resulting from discrepancies between a first test report and either a second or a control test report. In the preferred embodiment, the test report resulting from an execution of a test case assumes the same name as the test case or the test data within the test case. By reporting the execution steps of the test and the resulting test results in a test report, a test may be verified free from human error as a test operator is not required to manually observe the execution of the test and designate from personal observation the integrity of the test.

Transaction Tester

Figure 5:
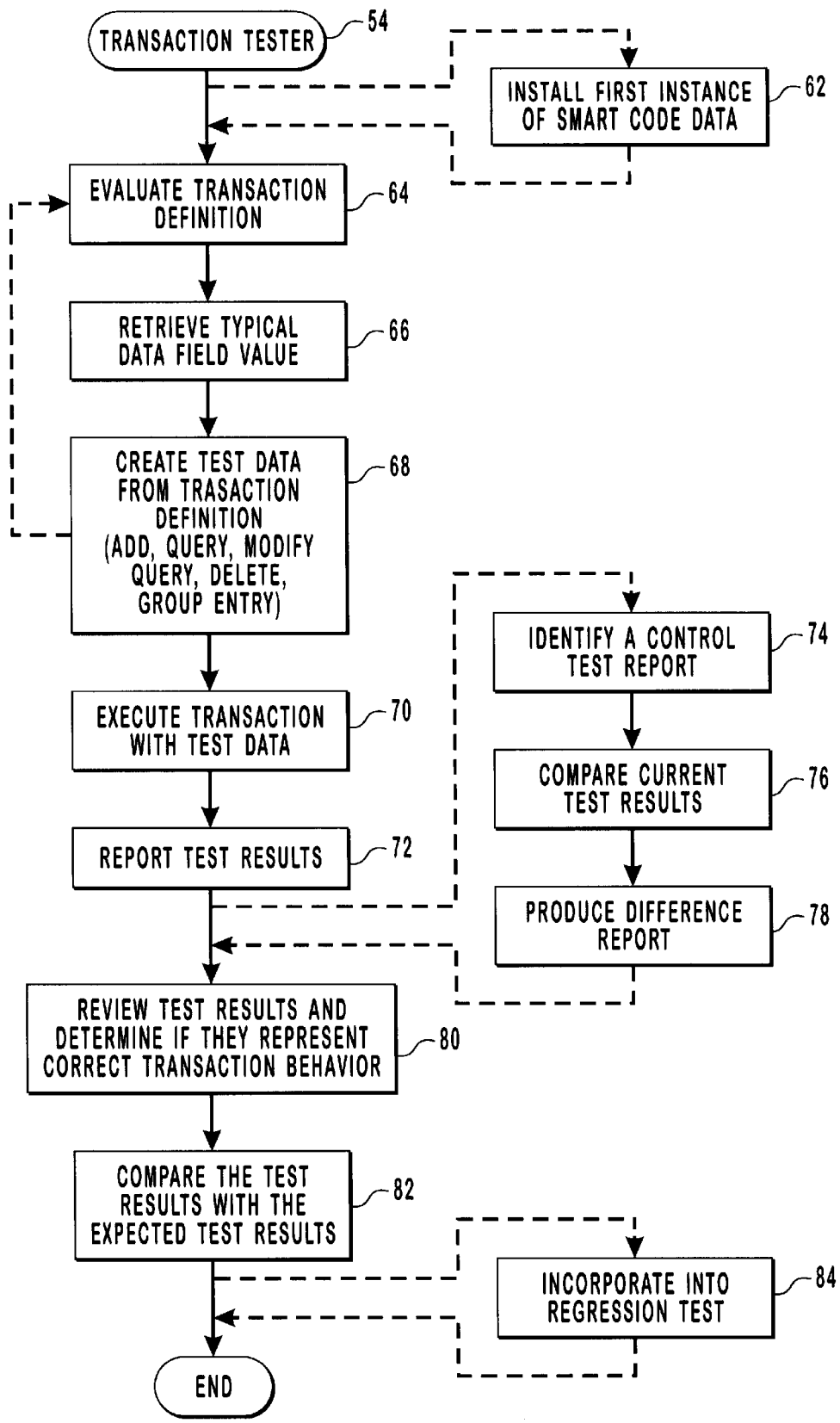
FIG. 5 is a flowchart for testing a transaction, in accordance with a preferred embodiment of the present invention.

FIG. 5 depicts a flowchart detailing the steps associated with transaction tester 54, in accordance with a preferred embodiment of the present invention. As briefly mentioned above, transaction tester 54 facilitates a rapid, efficient and repeatable testing of the transactions associated with the application. Such transaction testing is performed in an automatic manner wherein the transaction tester 54 creates, runs and checks transaction tests. The present invention provides a method for testing a transaction of a software application using test data that is automatically generated from the definition of the transaction.

A traditional transaction test process begins with a user or tester specifying a specific transaction. The transaction is thereafter opened and available for the receipt of test data in order to exercise the functionality of the transaction under test. As the transaction tester is operated, the transaction tester 54 in a step 64 evaluates the transaction definition to determine the data fields associated with the transaction. In a step 66, transaction tester 54 retrieves typical values for the data fields stored as part of the transaction definition. During the development phase of a transaction, one of the parameters provided to the transaction definition is a list of typical values for the data fields associated with the transaction under development. At the time of use of the transaction tester on the designated transaction, those typical values for data fields are retrieved and are thereafter incorporated into test data for providing a thorough analysis of the transaction.

In a step 68, transaction tester 54 creates test data utilizing the typical values for the data fields retrieved from the transaction definition. In the preferred embodiment of the present invention, the test data that is created typically takes the form of those functions most commonly employed in a transaction database application. For example, in the creation of test data step 68, transaction tester 54 creates test data for adding an entry corresponding to one of the typical values found in the transaction definition. The transaction tester therefore creates test data for adding an entry, querying back the added entry from the database followed by other database manipulation commands including a test data command for modifying an entry in the data and querying back the modified entry in the database as well as deleting an entry in the database and querying back that portion of the database to verify that the entry has indeed been deleted from the database.

Once the test data has been created, a step 70 is performed wherein the transaction executes the created test data and generates corresponding results.

In a step 72, transaction tester 54 reports test results in a current test report from the test data following execution step 70. The current test report displays the transaction behavior resulting from the execution of the transaction on the test data. In one embodiment of the present invention, in a step 74 a tester may identify the current test report as a control test report to designate a testing baseline for subsequent evaluation. Thereafter, in a step 76 the current test report may be compared with the control test report to determine differences manifesting themselves during a regression test. Differences that do appear may be flagged and displayed by producing a difference report detailing differences between the current test report and the control test report in a step 78.

While a control test report may be identified in a step 74, such an identification requires human intervention into the actual verification of the test results. In a step 80, transaction tester 54 automatically reviews test results from the created test data. For example, if test data is generated to add an entry to a database of a typical value, transaction tester 54 knows what the response to the query process should be when that typical value is queried back from the database. Likewise, for other operations on the database created as test data, the transaction tester knows what test results to expect for modifications and deletions from the database. Therefore, transaction tester 54, in a step 80, reviews the test results from the execution of the generated test data and reports incorrect transaction behavior. Such an automatic creation of test data and an automatic review of test results provides the automated testing capability of transaction tester 54.

After the transaction is tested to the satisfaction of the transaction designer or tester, the transaction may be incorporated into a regression test in a step 84 wherein routine execution of the transaction is performed, generally on a daily basis, to continually monitor and track the performance of the transaction throughout the various phases of the software application life cycle.

Transaction tester 54 may additionally incorporate transaction modifying data into the transaction at run time as illustrated in step 62. In the present invention, specialized transactions may be created which are hereafter identified as "smart code" transactions. Such transactions enable the user to define what the first instances of information should be in a transaction. Thereafter, smart code tester 56 verifies that after the transaction is up and running, those instances are in the transaction. For example, virtually every application incorporates a yes/no field wherein a selection is to be made. Therefore, each application must have a transaction where corresponding data is maintained that defines the selection of a "yes" response to correspond with a portion of code hereinafter designated as Y. Likewise, a "no" response corresponds to a portion of code hereinafter designated as N. Therefore, as the application is reconfigured with differing responses, for example, in the translation to a foreign language, a response "yes" may be mapped to the same code as may the "no" response for the transaction. At run time for the transaction, smart code tester 56 performs like the transaction tester 54, but it also installs the first set of values, in the present example corresponding to the responses Y and N, thereby forming the first instances of data.

Menu Tester

Figure 6:
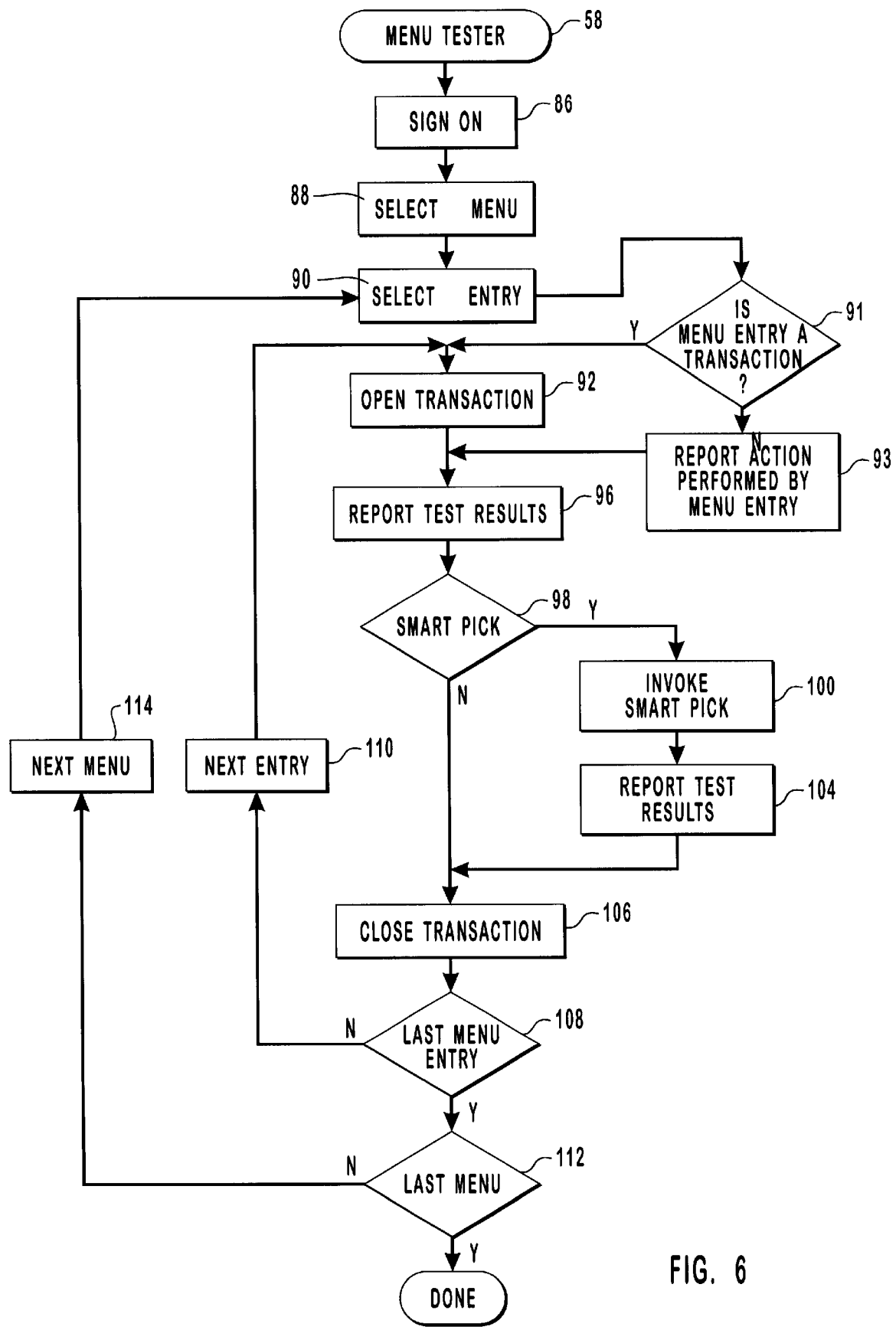
FIG. 6 is a flowchart for testing a menu structure in a software application, in accordance with a preferred embodiment of the present invention.

In FIG. 6, a menu tester module 58 exercises all the menus for the application. Menu tester 58 also verifies that each menu entry invokes another menu, a transaction or other functionality of the software application. Menu tester 58 yet further verifies that each transaction associated with an entry in the menu successfully opens and closes as directed by the menu structure.

In a step 86, the menu tester signs onto the application system. In the present application as the application is being tested, menu tester will choose each menu and verify that the menu structures are operative. Menu tester 58 thereafter selects a first entry from the first menu in a step 90. In step 91, menu tester 58 determines if the menu entry is a transaction. If so, menu tester 58 proceeds to step 92; otherwise menu tester 58 performs step 93. In a step 92, menu tester 58 opens a first transaction corresponding to the first entry within the menu. Menu tester 58 reports the action performed by the menu entry as shown in step 93. Menu tester 58 then proceeds to step 96. Menu tester 58 records or reports the output for the specific transaction that was open in a step 96 in a test report.

A task 98 determines if the present entry utilizes a technique for presenting the valid entries of a field in a set of possible valid values. In the present invention, those entries that are members of a specific set of valid values for a field are designated as "smart picks." A task 98 determines if any field utilizes smart picks. When smart picks are present, a smart pick tester 60 selects a first smart pick and, in a step 100, invokes the smart pick to show the list of valid data for the field. A report test result step 104 displays the test results in a test report such that any changes or modifications to the smart picks are noted when the present test report is compared with a stored or control test report. The above process is repeated for each of the smart pick fields in the transaction.

A close transaction step 106 closes the present transaction as pointed to by the first entry in the first menu after evaluation of that transaction has been completed. Furthermore, as menu structures are comprised of multiple entries, a last menu entry step 108 determines whether each of the entries within the present menu have been evaluated. When all of the menus have not been evaluated, the entry is incremented to the next entry in a step 110 and processing returns to opening the newly selected transaction. However, when the last menu entry has been evaluated, a test 112 determines if the last menu has also been evaluated. If the last menu has not been fully evaluated, then testing proceeds to the next menu in a step 114 until all menus and all entries of those menus have been evaluated using the above described method.

Test Report

FIG. 7 depicts an exemplary test report. The test report is a series of sequential lines that describe the test case and the resulting application behavior. It should be pointed out that each line of the test report contains leading characters defining the name of the test case such that each test case has a unique identifying name followed by a sequence number of a transaction within a case. Those skilled in the art will appreciate that there can be many transactions within a test case depending upon the complexity of the test case and the application undergoing, testing. The test case name and sequence number are followed by a line number of a line in the test report allowing each line to be uniquely identified for use in a difference report so that the location of the line number and test creating the discrepancy may be identified. In the preferred embodiment, test reports may contain lines that are indented to more clearly communicate information and denote information related to the next higher level.

Each time a test operator runs a regression test, the auto test module produces a current test report for that particular test run and may automatically compare that test report with a control test report. As a by product or result of the comparison of the two test reports a difference report is generated, which is depicted in FIG. 8. The difference report details differences between the test report and the control test report. While the difference report presents a description of the test data performed and the results from the test execution, the format of the difference report may also be filtered to report only certain differences thereby improving the comprehensibility of the difference report. FIG. 8 depicts a difference report which lists the names of the test reports compared and the filters applied as well as the differences between the two files. In the body of the difference report there are only three types of output in the preferred embodiment. The first type of output is a "missing" type which means that a line is missing from one test report that is present in the other. A second type or kind of designator in a difference report is an "extra" type which implies that a line is present in one test report and is missing from another. When the difference report designates two lines, a difference exists between a line that exists in both of the test reports. When two lines are present, one line is preceded by a "has" designator which means that one test report has a line that is different while the second designator, "not" identifies the line in the other test report from which it differs. It should be pointed out that in the body of the difference report each line or entry has either a "missing," "extra" or "has" and "not" designator as well as a name, a test sequence number and a test report sequence number.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a software application for interacting with a database, a method for testing a transaction of said software application using test data automatically generated from a definition of said transaction, comprising the steps of:

A (1) evaluating said transaction to determine data fields included within said transaction;

B (2) retrieving from said definition of said transaction typical values for said data fields stored as part of said definition;

C (3) creating said test data utilizing said typical values of said data fields; and D (4) executing said transaction with said test data.

2. The method for testing a transaction of said software application as recited in claim 1, wherein said creating said test data step (step C) comprises creating test data to perform the step of:

(1) adding an entry corresponding to one of said typical values of one of said data fields to said database.

3. The method for testing a transaction of said software application as recited in claim 2, wherein creating said test data step (step C) comprises creating test data to perform the steps of:

(2) querying said entry from said database;

(3) modifying said entry into a modified entry in said database;

(4) querying said modified entry from said database;

(5) deleting said modified entry from said database; and (6) querying said database to verify deletion of said modified entry from said database.

4. The method for testing a transaction of said software application as recited in claim 1, wherein said creating said test data step (step C) further comprises (7) repeating said creating step for each of said typical values for said data fields stored in said definition of said transaction.

5. The method for testing a transaction of said software application as recited in claim 1, further comprising:

(E) reporting test results in a current test report from said test data following said executing step.

6. The method for testing a transaction of said software application as recited in claim 5, further comprising:

(F) when said test report exhibits favorable results, identifying said current test report as a control test report to designate a testing baseline for subsequent evaluation.

7. The method for testing a transaction of said software application as recited in claim 6, further comprising the steps of:

(G) comparing said current test report with said control test report to determine differences from said control test; and (H) when said differences exist, producing a difference report detailing differences between said current test report and said control test report.

8. The method for testing a transaction of said software application as recited in claim 5, further comprising the steps of:

(I) following said reporting test results step, reviewing test results from said test data generated in said creating step; and (J) reporting incorrect transaction behavior.

9. The method for testing a transaction of said software application as recited in claim 1, wherein said execution step further comprises:

(8) periodically executing said transaction with said test data as part of a regression test of said software application.

10. The method for testing a transaction of said software application as recited in claim 1, further comprising:

(k) prior to said evaluating step, installing smart code data corresponding to preferred instances of data into said data fields of said transaction.

11. In a software application for interacting with a database, a method for automatically testing a menu portion of said software application, comprising the steps of:
- (A) in a first menu having a first entry, opening a first transaction corresponding to said first entry;
- (B) reporting test results in a current test report, said test results being a representation of the results from the opening of said transaction; and
- (C) closing said transaction.

12. The method for automatically testing a menu portion of said software application, as recited in claim 11, wherein said method further comprises the steps of:
- (D) selecting a first menu within said software application; and
- (E) from said first menu, selecting a first entry from said first menu.

13. The method for automatically testing a menu portion of said software application, as recited in claim 11, wherein said opening step (A) further comprises the step of:
- (1) when said first entry includes any smart pick defining a member of a set of valid data values for a field within said transaction;
- (2) invoking said smart pick to generate a representation of the results from the invocation of said smart pick; and
- (3) reporting test results from said invoking step, said test results being a representation of the results from said invoking step of said smart pick.

14. The method for automatically testing a menu portion of said software application, as recited in claim 13, further comprising: for each smart pick entry of said entry in said menu repeating steps (A2) and (A3) for each of said smart picks.

15. The method for automatically testing a menu portion of said software application, as recited in claim 13, further comprising the step of repeating the steps A, B, and C for each of said entries within each of said menus of said menu portion of said software application.

16. A computer program product for use in a computer system having a memory, the program product having computer-usable instructions for testing a transaction of a software application using test data automatically generated from a definition of said transaction, said product comprising:
- program code for evaluating a transaction to determine data fields included within said transaction;
- program code for retrieving from a definition of said transaction typical values for said data fields stored as part of said definition;
- program code for creating a test data utilizing said typical values of said data fields; and
- program code for executing said transaction with said test data.

17. The computer program product as recited in claim 16 wherein said computer-readable instructions for creating said test data comprises computer-readable instructions in the form of computer readable programming code including:
- program code for adding an entry corresponding to one of said typical values of one of said data fields to said database.

18. The computer program product as recited in claim 16, wherein said computer-usable instructions for creating said test data comprises computer-readable instructions in the form of computer readable programming code including:
- a database;
- program code for querying said test data from said database;
- program code for modifying said test data into a modified entry in said database;
- program code for querying said modified entry from said database;
- program code for deleting said modified entry from said database; and
- program code for querying said database to verify deletion of said modified entry from said database.

19. The computer program product as recited in claim 16 wherein said computer-readable instructions for creating said test data, further comprises computer program code for repeating said creating step for each of said typical values for said data fields stored in said definition of said transaction.

20. The computer program product as recited in claim 16, having further computer program code for reporting test results from said test data as a test report.

21. The computer program product as recited in claim 20, having further computer program code for, when said test report exhibits favorable results, designating said test report as a control test report to establish a testing baseline for subsequent evaluation.

22. The computer program product as recited in claim 21, further comprising:
- (1) computer program code for comparing a test report with said control test report to determine differences from said control test; and
- (2) computer program code for when said differences exist, producing a difference report detailing differences between said a test report and said control test report.

23. The computer program product as recited in claim 20, further comprising:
- (1) computer program code for reporting reviewing reported test results from said test data; and
- (2) computer program code for reporting incorrect transaction behavior.

24. The computer program product as recited in claim 16, wherein said computer program code for executing said transaction, further comprises periodically executing said transaction with said test data as part of a regression test of said a software application.

25. The computer program product as recited in claim 16, further comprising computer program code for, prior to said evaluating step, installing smart code data corresponding to preferred instances of data into said fields of said transaction.

26. A computer program product having computer-executable instructions for automatically testing a menu portion of a software application for interacting with a database, said computer-executable instructions further comprising computer readable program code thereon comprising:
- in a first menu having a first entry, program code for opening a first transaction corresponding to said first entry;

program code for reporting test results in a current test report, said test results being a representation of the results from the opening of said transaction; and program code for closing said transaction.

27. The computer program product as recited in claim 26, further comprising:

(1) program code for selecting a first menu within a software application; and (2) from said first menu, program code for selecting a first entry from said first menu.

28. The computer program product as recited in claim 26, wherein said program code for opening further comprises:

when said first entry includes any smart pick, program code for defining a member of a set of valid data values for a field within said transaction;

program code for invoking said smart pick to generate a representation of the results from the invocation of said smart pick; and program code for reporting test results.

29. The computer program product as recited in claim 28, further comprising: for each smart pick entry of said entry in said menu, program code for repeating the invoking and reporting for each of said smart picks.

30. The computer program product as recited in claim 28, further comprising computer program code for repeating opening, reporting and closing said transaction for each of said entries within each of said menus of said menu portion of said software application.

* * * * *